US006750876B1

(12) United States Patent
Atsatt et al.

(10) Patent No.: US 6,750,876 B1
(45) Date of Patent: Jun. 15, 2004

(54) PROGRAMMABLE DISPLAY CONTROLLER

(75) Inventors: Sean R. Atsatt, Santa Cruz, CA (US); William S. Jacobs, Santa Cruz, CA (US)

(73) Assignee: ESS Technology, Inc., Fremont, CA (US)

( * ) Notice: Subject to any disclaimer, the term of this patent is extended or adjusted under 35 U.S.C. 154(b) by 0 days.

(21) Appl. No.: 09/188,996

(22) Filed: Nov. 9, 1998

Related U.S. Application Data

(60) Provisional application No. 60/066,024, filed on Nov. 16, 1997, provisional application No. 60/066,023, filed on Nov. 16, 1997, and provisional application No. 60/066,022, filed on Nov. 16, 1997.

(51) Int. Cl.$^7$ ................................................ G09G 5/00
(52) U.S. Cl. ........................ 345/656; 345/204; 345/440; 345/522; 345/531; 345/532; 345/534; 345/538; 345/619; 345/625; 345/634; 345/650; 345/667; 345/682; 348/575
(58) Field of Search .................. 345/204, 440, 345/522, 531, 532, 534, 538, 619, 625, 634, 650, 656, 687, 682; 348/575

(56) References Cited

U.S. PATENT DOCUMENTS

| | | | | |
|---|---|---|---|---|
| 3,573,386 A | * | 4/1971 | Thompson | 379/234 |
| 4,630,307 A | | 12/1986 | Cok | 382/25 |
| 4,713,779 A | * | 12/1987 | Graciotti et al. | 395/500 |
| 5,008,739 A | | 4/1991 | D'Luna et al. | 358/21 |
| 5,053,861 A | | 10/1991 | Tsai et al. | 358/13 |
| 5,249,053 A | | 9/1993 | Jain | 358/209 |
| 5,309,552 A | * | 5/1994 | Horton et al. | 345/431 |
| 5,373,322 A | | 12/1994 | Laroche et al. | 348/273 |
| 5,382,976 A | | 1/1995 | Hibbard | 348/273 |
| 5,497,246 A | | 3/1996 | Abe | 358/426 |
| 5,534,921 A | | 7/1996 | Sawanobori | 348/333 |
| 5,579,057 A | * | 11/1996 | Banker et al. | 348/589 |
| 5,629,734 A | | 5/1997 | Hamilton, Jr. et al. | 348/222 |
| 5,666,160 A | | 9/1997 | Hwang | 348/240 |
| 5,666,209 A | | 9/1997 | Abe | 386/109 |
| 5,791,270 A | * | 8/1998 | Mori | 112/102.5 |
| 5,805,148 A | * | 9/1998 | Swamy et al. | 345/547 |
| 5,918,192 A | * | 6/1999 | Tomaszewski | 702/85 |
| 5,950,031 A | * | 9/1999 | Yamagata | 396/429 |
| 6,034,626 A | * | 3/2000 | Maekawa et al. | 340/995.21 |
| 6,042,280 A | * | 3/2000 | Yamaguchi et al. | 400/120.16 |
| 6,173,358 B1 | * | 1/2001 | Combs | 711/100 |
| 6,233,634 B1 | * | 5/2001 | Clark et al. | 710/126 |
| 6,348,904 B1 | * | 2/2002 | Arai et al. | 345/10 |

\* cited by examiner

*Primary Examiner*—Bipin Shalwala
*Assistant Examiner*—Vincent E. Kovalick
(74) *Attorney, Agent, or Firm*—Farjami & Farjami LLP

(57) ABSTRACT

A programmable display controller for use in a digital imaging system has a video control register, a data access controller and a programmable modulator. The programmable display control is designed to be used with a digital imaging systems, such as digital cameras, having a variety of display different devices that require respective different control signals, different image signal modulations, and so on. The video control register stores video mode bits indicating the type of video signal to output. The data access controller has a buffer for requesting image data and storing the requested image data in the buffer. The programmable modulator, in response to the video mode bits, generates a video signal from the image data stored in the buffer. In some embodiments, a decoder detects and decodes a link code in received image data. An address generator is responsive to the decoder and outputs a link address corresponding to the decoded link code for fetching image data that is stored at the link address.

36 Claims, 7 Drawing Sheets

| Phase | Pixel | PAL Step | Luma Reg 1 | Chroma Reg 1 | Old Chroma Reg | Accumulator Value | Output Latch |
|---|---|---|---|---|---|---|---|
| 0 | 0 | 1 | Y0 | U0 | 0 | 0 | - |
| 0 | 0 | 0 | Y0 | U0 | 0 | Y0 + 0 cos | - |
| 0 | 0 | 1 | Y0 | U0 | 0 | Y0 + 0 cos + U0 sin | Y0 + 0 cos+ U0 sin |
| 90 | 1 | 0 | Y1 | V1 | U0 | Y1 + U0 cos | - |
| 90 | 1 | 1 | Y1 | V1 | U0 | Y1 + U0 cos - V1 sin | Y1 + U0 cos - V1 sin |
| 180 | 2 | 0 | Y2 | U2 | V1 | Y2 - V1 cos | - |
| 180 | 2 | 1 | Y2 | U2 | V1 | Y2 - V1 cos - U2 sin | Y2 - V1 cos - U2 sin |
| 270 | 3 | 0 | Y3 | V3 | U2 | Y3 - U2 cos | - |
| 270 | 3 | 1 | Y3 | V3 | U2 | Y3 - U2 cos + V3 sin | Y3 - U2 cos + V3 sin |

FIG. 8

PROGRAMMABLE DISPLAY CONTROLLER

This application claims the benefit of U.S. Provisional Application No. 60/066,022, filed Nov. 16, 1997, U.S. Provisional Application No. 60/066,023, filed Nov. 16, 1997, and U.S. Provisional Application No. 60/066,024, filed Nov. 16,1997.

The present invention relates generally to digital imaging, and particularly to a programmable display controller for digital imaging.

BACKGROUND OF THE INVENTION

Advances in technology have made possible the electronic still camera for photography. In photographic cameras, the image-forming light is sensed and recorded directly on film. Unlike photographic cameras, the electronic still camera uses an electronic image sensor to sense the image-forming light and a separate recording medium to record and store the picture. Because the electronic still camera uses digital technology, the electronic still camera is a type of digital camera.

Typically the electronic image sensor in a digital camera is a solid-state device such as a charge-coupled device (CCD) or a complementary metal-oxide-semiconductor (CMOS) device. The image sensor connects to electronic interface circuitry which connects to a storage device and, optionally, to a display.

A typical image sensor has many cells or pixels arranged along vertical and horizontal dimensions in a matrix. In response to light, the cells generate a charge or voltage which represents image information. The image sensor senses an image and stores image information, i.e., a charge or voltage, corresponding to the sensed light in the cells. Image sensors are made in many sizes such as, e.g., 400×300, 640×480, 1024×768, and 4096×4096 pixels. The image information stored in the cells is output serially from the image sensor using an arrangement of shift registers. The shift registers are arranged along vertical and horizontal dimensions and are coupled to the cells. The cells and shift registers require timing, or clock, signals, having specific timing requirements, to output the image information. Each type of image sensor has its own unique timing requirements. Typically, a single image sensor requires many clock signals to control the flow of image information in both the horizontal and vertical dimensions. The clock signals must be synchronized. For example, to output image information from a 640×480 CCD requires 480 vertical shifts and 640 horizontal shifts for each vertical shift. Within a single dimension, the clock signals to control the flow of image information have different phases that must be synchronized. Furthermore, shifting the information out of the image sensor requires timing signals to synchronize the image sensor's operation with an analog signal processor (ASP) and an analog-to-digital (A/D) converter.

The image information sensed by each cell is also called a pixel. After being converted to digital form, the image information (image data) is stored in a memory, typically an image memory. Image sensors having a larger numbers of cells produce higher quality images; however, more pixel information must be processed and stored.

Typically, a digital signal processor processes the digital image data to improve the quality of the image. Various algorithms well-known in the art are used to improve image quality. Because there is such a large amount of image data, the image data is compressed before storage in a storage medium.

Color imaging increases the complexity of processing the digital image data. In one method, the image sensor has a geometric arrangement of cells to respond to three colors, e.g., red, green and blue. Since each cell senses a particular color, various algorithms are used to interpolate the missing color information. Alternatively, two or more image sensors having different color sensitivity can be used and the image information is combined.

A color pixel value can be represented in a red-green-blue (RGB) format. RGB format has three intensity components: a red component, green component and blue component. Video systems typically convey image data in the form of a component that represents brightness (luma or Y), and two other components that represent color, i.e., color difference components $C_b$ and $C_r$ which are also represented as U and V components. $C_b$ is equal to "blue" minus "luma," i.e., B−Y. $C_r$ is equal to "red" minus "luma," i.e., R−Y. RGB formatted data can be converted to $YC_bC_r$ formatted data using the formula:

$Y=0.299R+0.587G+0.114B$ $C_b=-0.169*R-0.331*G-0.500*B+128$ $C_r=0.500*R-0.419*G-0.081*B+128$

Composite NTSC and PAL video use a YIQ format for encoding color pixel values. YIQ represents luma (Y) accompanied by color difference components I (In-phase) and Q (Quadrature). I and Q are derived from U and V by a +33° rotation and an exchange of axes.

Different types of video displays have different video format requirements. Some typical video format requirements are NTSC, S Video and PAL. The NTSC, S-Video and PAL formats all output an analog signal. To output digital image information to an NTSC, S-video or PAL display, the digital image information stored in an image memory must be converted to an analog form.

NTSC is an acronym for the National Television Systems Committee and also refers to a method for converting digitally encoded color video data based on quadrature modulation of the I and Q color difference components of the YIQ data onto a color subcarrier frequency, then adding the resulting chroma signal to the luma signal. NTSC video is used with a subcarrier frequency of 455/2 times the horizontal line rate (about 3.579545 MHz). The color subcarrier is about 3.58 MHz in conventional NTSC and about 4.43 MHz in conventional PAL.

S-video is an interface that conveys luma and quadrature modulated chroma signals separately. There are two types of S-video: S-video-525 and S-video-625. S-video-525 uses a 3.58 MHz subcarrier, as in NTSC. S-video-625 uses a 4.42 MHz subcarrier, as in PAL. S-video uses quadrature modulation. S-video does not use frequency interleaving. Phase Alternate Line (PAL) is a composite color standard similar to NTSC except that the V-axis subcarrier reference signal inverts in phase at the horizontal line rate, and burst meander is applied. The modulation function to generate the composite PAL video signal from the YUV data uses values called sin(p) and cos(p). P is equal to the amount of phase shift and the phase shift varies. Typically, in a YUV to PAL converter, the values for sin(p) and cos(p) are stored in a table and cannot be changed. In PAL video, the phase p is different for each pixel in a scan line. A lookup table for eight-bit sine and cosine values for a single value of p requires that 512 values be stored. Therefore, the look-up table is very large and requires a large area if implemented as an integrated circuit. A method and apparatus are needed to allow the sin(p) and cos(p) values to be dynamically changed and reduce the amount of phase information to be stored on an integrated circuit.

Some digital cameras have a viewfinder mode in addition to an image acquisition mode. In viewfinder mode, the image to be acquired is displayed on a display. The image data stored in memory comprises a large amount of pixel data. For example, a 640×480 CCD has about 307,200 pixels. To properly reconstruct the image, data corresponding to each pixel must be stored. Assuming each pixel is represented by one byte for each of the RGB color values, then about 921,000 bytes are needed to store the image.

However, the data may be displayed on a variety of displays and each display may use a different video format. The different video formats involve tradeoffs between video resolution, frame rate, still image quality, and compression quality. Therefore, in order for a display controller to be usable with a variety of display devices and a variety of display modes, a method and apparatus are needed to provide a selectable display format. Moreover, because some formats require more storage than others, a method and apparatus are needed to reduce the amount of storage space required in image memory.

SUMMARY OF THE INVENTION

A programmable display controller for use in a digital imaging system has a video control register, a data access controller and a programmable modulator. The programmable display control is designed to be used with a digital imaging systems, such as digital cameras, having a variety of display different devices that require respective different control signals, different image signal modulations, and so on. The video control register stores video mode bits indicating the type of video signal to output. The data access controller has a buffer for requesting image data and storing the requested image data in the buffer. The programmable modulator, in response to the video mode bits, generates a video signal from the image data stored in the buffer.

In some embodiments, a decoder detects and decodes a link code in received image data. An address generator is responsive to the decoder and outputs a link address corresponding to the decoded link code for fetching image data that is stored at the link address.

The programmable display controller may include a special code decoder for detecting and decoding one or more special codes in received data. The received data has an associated video mode and also has at least one associated coefficient. A storage register is responsive to the special code decoder and stores the associated coefficient. A modulation function generator modulates the received data using the at least one coefficient stored in the storage register to generate a video signal.

BRIEF DESCRIPTION OF THE DRAWINGS

Additional objects and features of the invention will be more readily apparent from the following detailed description and appended claims when taken in conjunction with the drawings, in which:

FIG. 8 is a table depicting a state diagram implemented by a phase controller of FIG. 6 and used to control the modulation function generator of FIG. 7.

DESCRIPTION OF THE PREFERRED EMBODIMENTS

Figure 1:
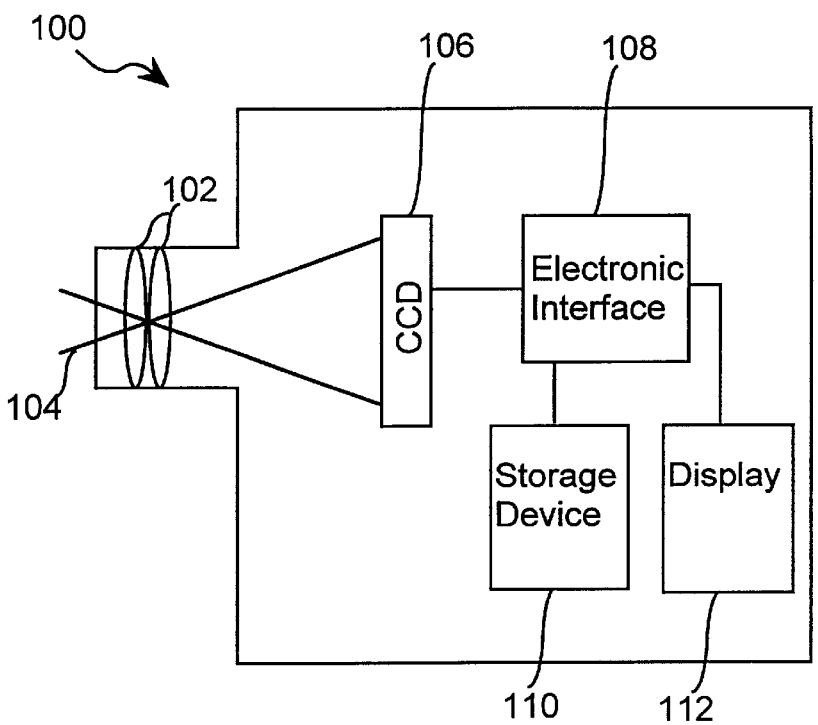
FIG. 1 is a block diagram of a electronic digital camera embodying the programmable display controller of the present invention.

FIG. 1 is a block diagram of a digital camera embodying the display controller of the present invention. A lens 102 transmits the image-forming light 104 onto an electronic image sensor (image sensor) 106. The image sensor 106 is built into the camera and is located at the focal plane of the lens. The image sensor 106 is typically a charge-coupled device (CCD) or a complementary metal-oxide-semiconductor (CMOS) sensor. Image sensors differ in the arrangement of the cells within the image sensor and the type of charge readout. The image sensor 106 connects to electronic interface circuitry 108. The electronic interface circuitry 108 also connects to a storage device 110 and an optional display 112. The electronic interface circuitry 108 controls the storage device 110 to store the image sensed by the image sensor 106. The storage device 110 can include a tape drive, a disk drive, such as a floppy disk drive, hard disk drive, optical disk drive or magneto-optical disk drive, or an integrated circuit card with a RAM or EEPROM. The storage device 110 can be inside the digital camera 100 or attached to the camera externally. The electronic interface circuitry 108 can also control the display 112 to display the image sensed by the image sensor 106. The display 112 can be inside the digital camera or attached to the camera externally. The electronic interface circuitry can operate the display 112 in either a viewfinder mode or a review, i.e., stored image viewing mode.

Figure 2:
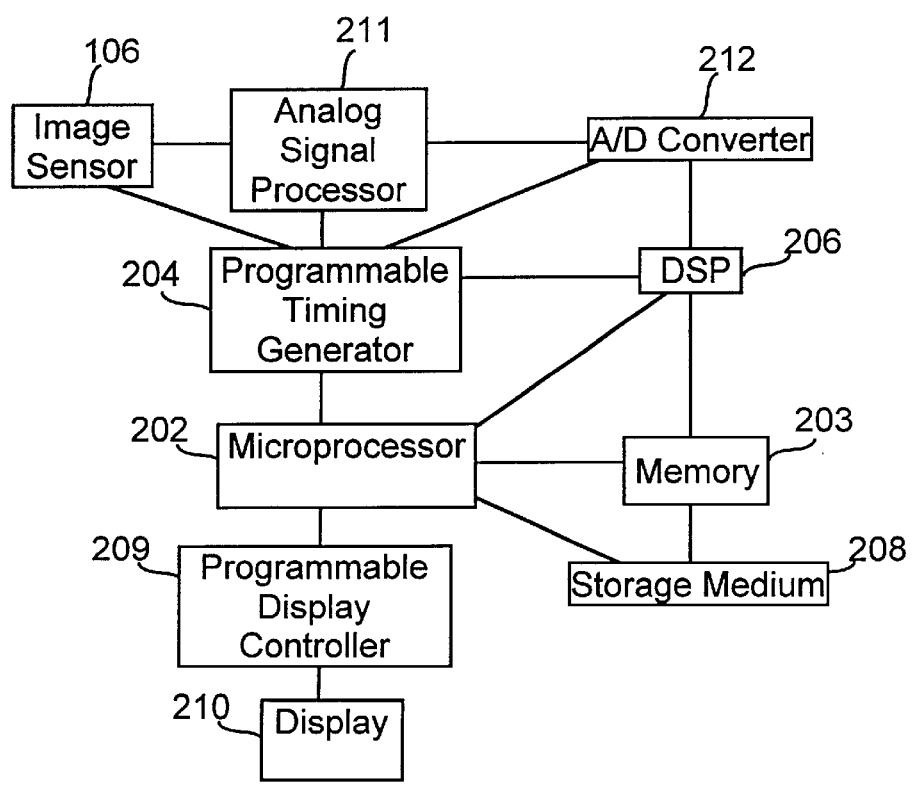
FIG. 2 is a detailed block diagram of the electronic digital camera of FIG. 1.

FIG. 2 is a block diagram of the electronic interface circuitry of the electronic digital camera of FIG. 1. A microprocessor 202 is coupled to a memory 203, a timing generator 204, a digital signal processor (DSP) 206, a storage medium 208 and a programmable display controller 210. The programmable display controller 210 is coupled to a display 220 and the memory 203. The image sensor 106 connects to an analog signal processor (ASP) 211 which is coupled to an analog-to-digital (A/D) converter 212. The timing generator 204 is coupled to the image sensor 106, ASP 211, the A/D converter 212, the DSP 206 and the microprocessor 202. The memory 203 is coupled to the DSP 206. Preferably, the image-memory is a high-speed DRAM used to store digital image data. The A/D converter 212 supplies digital image data to the DSP 206, which stores the digital image data in the memory 203. The timing generator 204 supplies timing signals to the DSP 206 and A/D Converter 212 to synchronize the transfer of digital image data between the A/D converter 212 and the DSP 206.

The microprocessor 202 executes a camera operation procedure which is stored in the memory 203. Alternatively the camera operation procedure can be stored in a read-only-memory, or loaded into the memory 203 from the storage medium 208. The camera operation procedure comprises an image acquisition procedure. When a user presses a store-image button (not shown), the camera operation procedure causes the image sensor 106 to acquire an image. The image acquisition procedure causes the microprocessor 202 to control the timing generator 204 to generate vertical and horizontal clock signals for use by the image sensor 106. The image sensor 106 outputs image data comprising a series of analog signals corresponding to the color and intensity of the image sensed by each cell. The image data is then sent to the ASP 211 and to the A/D converter 212.

The ASP 211 processes the image data before input to the A/D converter. For example, the ASP has a programmable amplifier with adjustable gain, and also reduces or eliminates noise, such as reset noise, from the image data using methods well known to those in the art, such as correlation-double-sampling. The A/D converter 212 then converts the analog image data into digital image data. In an alternative embodiment, the ASP 211 is not used.

The digital image data is stored in the memory 203. The camera operation procedure causes the digital image data to be processed by the DSP 206. The processed digital image data is compressed and recorded in memory 203, on a storage medium 208 or displayed. To display the image data, the microprocessor's 202 camera operation procedure causes the programmable display controller 210 to request the image data from the memory 203. The programmable display controller 210 processes the image data and outputs the processed image data to a display 220.

U.S. provisional patent application, titled "Programmable Timing Generator for a Digital Camera," Serial No. 60/066,023, filed Nov. 16, 1997, is hereby incorporated by reference as background information regarding timing generator 204. The corresponding U.S. patent application, titled "Programmable Timing Generator for a Digital Camera," Serial No. 09/188,871, filed Nov. 9, 1998, is also hereby incorporated by reference as background information regarding timing generator 204.

U.S. provisional patent application, titled "Programmable Image Transform Processor for a Digital Camera," Serial No. 60/066,022, filed Nov. 16, 1997, is hereby incorporated by reference as background information as background information regarding digital signal processor 206. U.S. patent application, titled "Programmable Image Transform Processor for a Digital Camera," Serial No. 09/188,871, filed Nov. 9, 1998, is also hereby incorporated by reference as background information as background information regarding digital signal processor 206.

Figure 3:
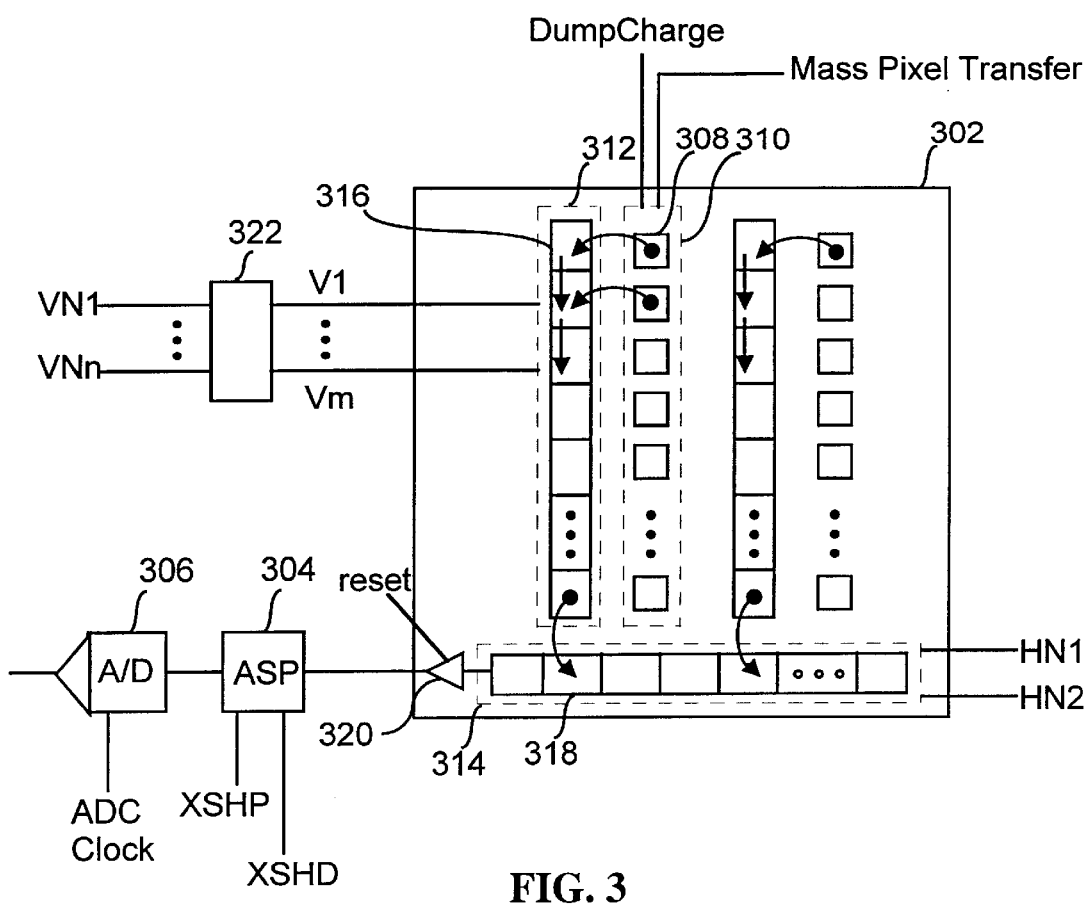
FIG. 3 is a diagram of an exemplary image sensor suitable for use with the present invention.

FIG. 3 is a block diagram of an exemplary image sensor suitable for use with the present invention. The image sensor 302 can be a CCD or CMOS device. The image sensor 302 connects to the ASP 304 and the A/D converter 306. The image sensor 302 has cells 308, vertical shift registers 312 and a horizontal shift register 314. Each cell 308 absorbs light and converts the light energy into an electrical charge. The amount of charge is a measure of the light energy absorbed. The size of the image sensor determines the quality of the image. The quality of the image improves as the number of cells increases. Image sensors are available in many sizes such as 400×300, 640×480, 1024×768, and 4096×4096 cells.

The components of the image sensor 302 are arranged along horizontal and vertical dimensions. An array 310 of cells 308 is arranged in the vertical dimension. The vertical shift register 312 has elements 316 for storing the charge sensed by the cells 308. Each cell 308 in the array of cells 310 connects to a corresponding element 316 in the vertical shift register 312.

Free charge moves from regions of higher potential to regions of lower potential. By alternating the voltage on the electrodes (not shown) connected to the cells 308 and the elements 316, 318 of the shift registers 312, 314 in proper phase, a charge packet, i.e., the charge from the cell 308, can be moved from the cell 308 to an element 316 of the shift register 312 and then moved from one element to another element in the shift registers.

In other words, when appropriate voltages are applied to the cell 308 and the corresponding element 316 in the vertical shift register 312, the charge generated in the cell 308 is transferred out of the cell 308 to the corresponding element 316 in the vertical shift register 312. The programmable timing generator is programmed to output timing or clock signals to cause the transfer of the charge to occur at the appropriate time. When appropriate voltages are applied to adjacent elements of the vertical shift register 312, the charge is transferred from one element to another. The last element or output of each vertical shift register 312 connects to a corresponding element 318 in the horizontal shift register 314. When appropriate voltages are applied to the last element of the vertical shift register 312 and the corresponding element 318 of the horizontal shift register 314, the charge is transferred from the vertical shift register 312 to the horizontal shift register 314. When appropriate voltages are applied to adjacent elements of the horizontal shift register 314, the charge is transferred from one element to another and finally output. The output of the horizontal shift register 314 connects to the ASP 304 via an output amplifier 320.

Color imaging is more complex. In one method, the image sensor 302 has a geometric arrangement of cells to respond to three colors, e.g., red, green and blue. Alternatively, two or more image sensors having different color sensitivity are used.

The Programmable Display Controller

Figure 4:
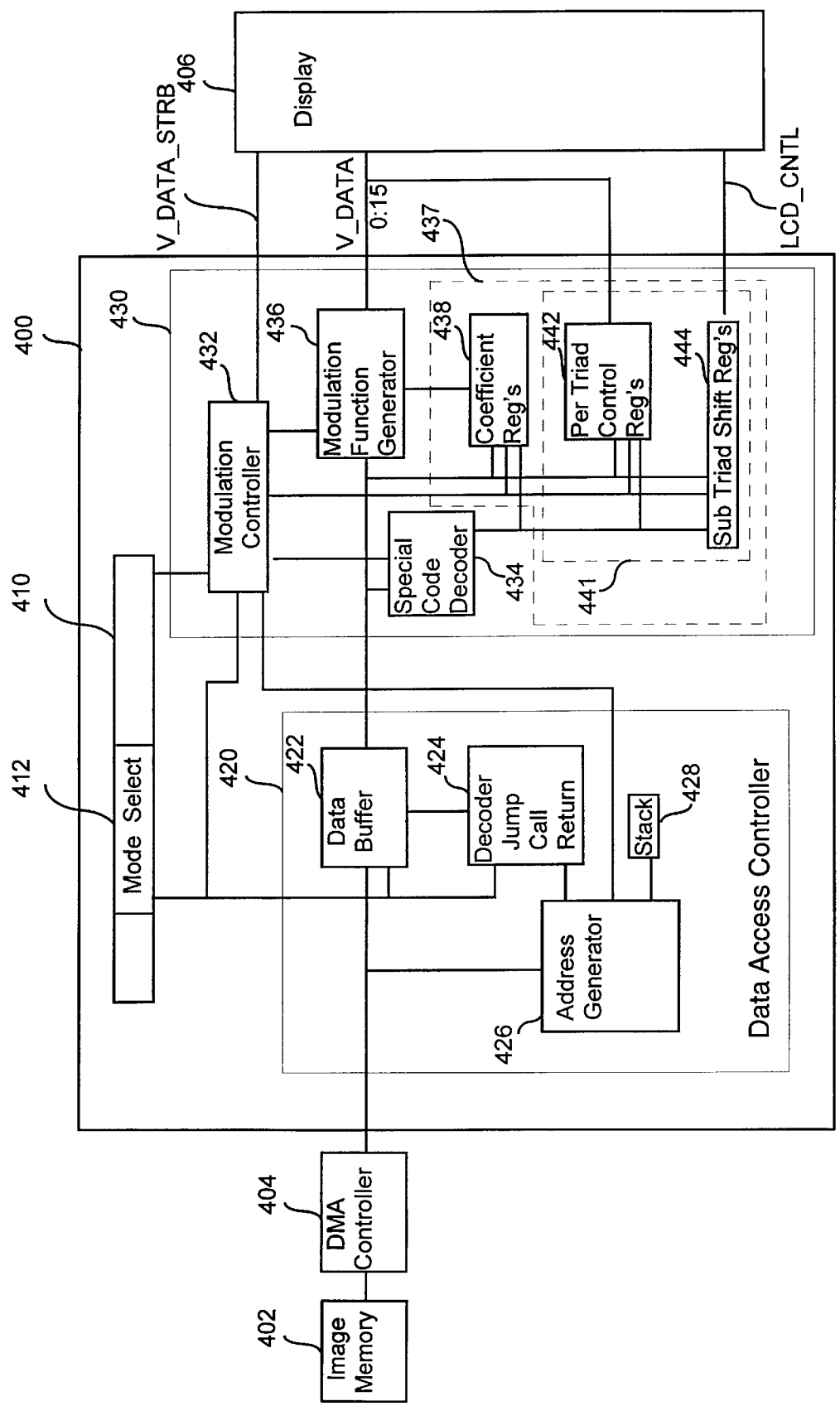
FIG. 4 is a detailed block diagram of the programmable display controller of the present invention.

FIG. 4 is a block diagram of the programmable display controller 400 of the present invention. The programmable display controller 400 receives image data and outputs the image data to a display 406 in the proper video format. In particular, the video signals output by the programmable display controller 400 to the display 406 are summarized in Table one below.

TABLE 1

Video Signals Output to Display

| Name | Description |
|---|---|
| V_DATA_STRB | Video Data Strobe. One video clock after data is valid, this signal is pulsed for one video clock. |
| V_Data(15:0) | In NTSC and PAL mode, video data is output on all sixteen bits of V_Data. In LCD mode V_DATA(7:0) output the pixel data and bits V_DATA(15:8) output control signals that can change once per triad. |
| LCD_CNTL(6:0) | LCD Control are programmable control signals that can change multiple times per pixel. |

The programmable display controller 400 connects to an address bus and a data bus, and has control signals. In one embodiment, the programmable display controller 400 connects to a DMA controller 404 to receive data stored in an image memory 402. In an alternative embodiment, the programmable display controller 400 can be connected to other devices in order to be supplied with image data.

Displays 406 can use a variety of video formats, and the programmable display controller 400 can be programmed to output video data, as well as video control signal, in a plurality of video formats such as Direct Play, NTSC, S-video, PAL and LCD. Each video format corresponds to a video mode.

The programmable display controller 400 includes a video control register 410, a data access controller 420 and a programmable modulator 430. The programmable modulator 430 modulates the received data and outputs a video signal to the display 406 based on the video mode of the received data, which is specified by the video control register 410. The programmable modulator 430 will be discussed in detail below.

The Video Control Register

The video control register 410 has at least one video-mode-select bit 412. The video control register 410 is coupled to the data access controller 420 and the programmable modulator 430. The camera's microprocessor camera operation procedure causes the camera's microprocessor to program the video control register 410 to select the desired video mode. The camera's microprocessor loads the video control register's 410 video-mode-select bit(s). The video-mode-select bit(s) allow the programmable display controller 400 to operate in a plurality of video modes. In one embodiment, the available video modes comprise Direct Play, NTSC, S-video, PAL and LCD modes. In alternative embodiments, other video modes are supported. The video control register 410 also stores the value of a "last link code," which will be described below.

Image data is stored in memory words in the image memory 402. Image data that is stored in the image memory 402 is input to the programmable display controller 400. The image data comprises pixel information. Each memory address stores a word or memory word. In the present invention, the memory word is thirty-two bits. In an alternative embodiment, the memory word can comprise "n" bits where n is the desired number of bits. Within the memory word, image data is stored in a predetermined memory-word format corresponding to the video mode. A memory word has an address that is used to access the information stored in the memory word.

Figure 5:
FIG. 5 is a diagram of the video control word register of FIG. 4.

FIG. 5 provides a detailed illustration of the fields and bits of the video control register 412 is shown. The mode select bits 412 of FIG. 4 include PAL, SVIDEO and LCD bits. Table two below defines the fields and bits of the video control register 412.

TABLE 2

Video Control Register

| Field/Bit Name | Description |
| --- | --- |
| PAL | The PAL bit is active when an LCD bit is equal to zero. When set, the PAL bit causes the display controller to operate in NTSC video mode. |
| THRESH31 | When set, THRESH31 causes the display controller to begin fetching data when only thirty-one words of data remain in a data buffer 422. When clear, the display controller begins fetching data when forty-seven words remain in the data buffer 422. |
| UNDER-FLOW | This bit is set when a video underflow occurs. An underflow occurs when there is insufficient DRAM bandwidth available to the display controller and it empties its data buffer before accessing the data bus. When an underflow occurs, the display controller attempts to resync to the data. |
| STROBE_DELAY | This field defines the number of video clocks after updating the output data on V_DATA(7:0) that a V_DATA_STRB signal is generated. The V_DATA_STRB signal is a pulse one video clock wide that occurs STROBE_DELAY+1 video clocks after the V_DATA pins are updated. |

TABLE 2-continued

Video Control Register

| Field/Bit Name | Description |
| --- | --- |
| VIDCLK_DIVIDE | This field defines the rate at which video data is played. When the LCD bit is zero, data is played at the V_DATA pins at the video clock frequency divided by (VIDCLK_DIVIDE+1). When the LCD bit is one, this field defines the number of video clocks per phase. The minimum value for this field is one. |
| LCD_6PHASE | When set, this bit causes the display controller to play LCD data in six phases rather than eight. The seventh and eighth phases are discarded. The sub-triad control bits circulate in six phases using the first six bits of each shift register and there is no phase on which data is not played. When this bit is clear, LCD data is played in four phases. |
| NEG_STRB | When set, this bit causes the V_DATA_STRB signal to be delayed an additional half of a video clock. |
| STRB_INV | This bit controls the polarity of the V_DATA_STRB pulse. |
| VIDCLK_SEL | When zero, this bit selects a desired input for a video clock signal. |
| REPEAT_EN | When set, this bit causes the display controller to repeat the last pixel a predetermined number of times. The pixel in data bits 31:16 is repeated N + 4 times if data bits 7:0 have a value of four. The number of times N that the pixel data is repeated is determined by bits 27:16 of the word following the repeat code. This allows for a maximum repeat value of 4,095 + 4. For example, a value of 0x00020004 followed by a 0x00000000 will cause a 0x0002 to be repeated four times. Due to the method by which chroma data is modulated, this feature should be used when the chroma data has a value of zero. The REPEAT_EN bit has no effect when the LCD bit is one. In this way, an odd number of pixels can be played in non-LCD mode. |
| MODU-LATE | When set, the MODULATE bit causes the video module to modulate the chroma channels for NTSC, PAL and S-video modes. When clear, the chroma channel is not modulated. This bit should be clear for direct play mode, and has no effect when the LCD bit is one. |
| SVIDEO | When set, the SVIDEO bit causes the modulation function generator to play the luma and chroma channels on two separate eight bit output channels with the luma channel on V_DATA(7:0) and the chroma channel on V_DATA(15:8). When clear, this bit causes the modulation function generator to sum the luma and chroma channels and play them on V_DATA(8:0). This bit has no effect when the LCD bit has a value equal to one. |
| LCD | When set, the LCD bit causes the display controller to operate in LCD mode as described above. When clear, the display controller operates in a video mode as defined by the other bits in the video control register. |
| LINK_CODE | The LINK_CODE field stores the value of the last link code processed while fetching data from memory. |
| GO | When the GO bit is set, the display controller starts to play data from the DRAM. There is a latency between the time GO is set and the time that the V_DATA_STRB signal begins strobing data out on the V_DATA pins. This is due to the time required to fetch the first sixty-four words of data from the DRAM. |

The Data Access Controller

Referring back to FIG. 4, the data access controller 420 is responsive to the video control register 412 and has a data buffer 422, a decoder 424, an address generator 426 and a stack 428.

The data buffer 422 is used to receive image data, i.e., memory words, from the data bus. The data buffer 422 stores a plurality of memory words. The data buffer 422 accommodates for delays in acquiring the image data from the image memory 402 by providing an available supply of image data for the programmable display controller 400. The data buffer 422 can be a FIFO buffer.

The decoder 424 detects and decodes an addressing link code in the received data.

The address generator 426 generates a memory word address from which to retrieve data and supplies that address to the address bus. The address generator 426 is responsive to the decoder 424 and allows jumps, calls and returns within the received data structure. The address generator 426 outputs an address corresponding to the decoded link code for fetching the image data stored at that address.

Address Control

The programmable display controller 400 has an Address Generator 426 which generates the desired address of image data to retrieve from the image memory 402.

Address Control-Link Codes

Using the address generator 426, the programmable display controller 400 acquires image data sequentially from the image memory 402 until a link code is detected. The selected video mode determines the programmable display controller's 400 memory-word format and the type of video signal output. The received image data is processed using the memory-word format corresponding to the selected video mode.

A link code is a data structure embedded in the image data. A link code can be used to cause repetitive patterns to be displayed at multiple image locations while storing only one copy of the repeated pattern in the image memory 402. The link code data structure resembles a linked list. The link codes include addressing codes and special purpose codes. The programmable modulator 430 detects and decodes the link codes, as will be discussed below.

The decoder 424 detects and decodes the addressing link codes. In one embodiment, the addressing link codes include a jump, a call and a return code or instruction. After detecting an addressing link code, the decoder 424 decodes the addressing link code to determine which addressing link code was received.

A call or a jump link code causes the address generator 426 to request data from the image memory 402 at the address specified by the call or jump link code. If a call or jump link code is received, the address generator 426 is loaded with the contents of the following memory word from the image memory 402. That is, the content of the subsequent memory word supplies the next address. The requested data is fetched from the image memory 402 and placed in the data buffer 422. After fetching the image data from the specified address, the address generator 416 continues to request image data from sequential addresses until a subsequent instruction is encountered. The call instruction also causes the stack 428 to store the address of the call instruction incremented by two. The return instruction causes the address generator 426 to load the last address stored in the stack 428 and request data from the image memory 402 using the loaded stack address.

The decoder 424 is also responsive to the video-mode-select bits 412. Some video formats use similar input data and therefore have the same memory-word format. However, many video formats have different input data requirements and therefore use a different memory-word format.

To decode link codes for modes that use different memory-word formats, the decoder 424 is responsive to the video-mode-select bits 412 of the video control register 410. LCD mode and non-LCD modes use different memory word formats. In LCD mode, the decoder 424 detects and decodes a link code in a different manner from that used in non-LCD modes.

In LCD mode, the decoder 424 detects a link code if the most significant bit (bit thirty-one) of the memory word is equal to one. In alternative embodiments, a different bit or group of bits is used to represent the link code. The decoder 424 determines the value of the link code from the two least significant bits of the data word. In alternative embodiments, a different group of bits is used to represent the value of the link code.

In non-LCD mode, each memory word stores two pixels. Each pixel is represented by sixteen bits: an eight-bit luma value and an eight-bit chroma value. In alternative embodiments each memory word might store just one pixel value or more than two pixel values. The luma value and chroma value may occupy more or less than eight bits in alternate embodiments.

In a preferred embodiment, whenever the image data contains a link code, an entire word is used to represent the link code. The decoder 424 detects a link code if bits seven through zero, i.e., a luma channel, have a value of three, two, or one. In alternate embodiments, other portions of a memory word could be used to represent link codes.

The programmable display controller 400 has the same response to a detected addressing link code in all modes. In an alternative embodiment, the programmable display controller may have different responses to detected addressing link codes in different modes.

Neither the contents of the memory word that contains the link code nor the subsequent memory word that contained the jump or call address are output to the display 406.

In the present embodiment, because of the link code structure, the values one, two and three are not output through the luma channel in non-LCD modes. Table 3 describes the operation of the data access controller when executing the three addressing link codes.

TABLE 3

Link Codes

| Link Code Value | Link Code Instruction | Operation |
| --- | --- | --- |
| 011 | Call | Push the current address + 2 onto the stack 428 and start fetching data from the location found in the subsequent received memory word. Address + 2 is pushed onto the stack 428 so that on a return, the memory address following the address storing the call code will be used to access the data. The "call" link code and subsequent "call" address are not output as image data |
| 010 | Return | Return to playing data at the location stored on the stack 428. The return link code is not output as part of the video signal. |
| 001 | Jump | Same as Call except that the current address is not pushed onto the stack. The subsequent location after a jump link code is used as an address, not as image data. |
| 000 | NOP | No Operation. Not a link code. Data is passed with no link occurring. |

In alternative embodiments, values other than one, two and three may be used for the link codes.

Initialization Sequence

First, the image memory 402 is loaded with data to be played. To repetitively output the image data stored in the image memory, a jump can be embedded within the image data to define the end of the image data and the starting address at which to repeat the image data. One jump link instruction can be used to create an infinite loop for repetitively displaying the data.

Second, the address generator 426 is loaded with the first location of data to be played. This address specifies a memory word location relative to the start of the image memory 402.

Third, the video control register 410 is loaded with the appropriate value. Many values can be loaded into the video control register 410. For example, a value of 0x00010201 will start the video playing at a rate of one-fourth of the main system clock, i.e., one-half the video clock which is one-half the system clock, in Direct Play mode.

The following is an exemplary data sequence that implements a loop using a link code. Assume that the stack register 428 is loaded with 0x000005, i.e., address five when the GO bit (in the video control register 410) is set to one and LCD mode is not set. Table 4 shows the address and the corresponding data for each memory work in the exemplary data sequence.

TABLE 4

| Address | Data |
|---------|------|
| 5 | 0x00060005 |
| 6 | 0x00080007 |
| 7 | 0x000A0009 |
| 8 | 0xFFFF0001 (Jump Link Code) |
| 9 | 0x00000005 (Address to jump to) |

The link code for a jump is stored as the data of address 8, in bits seven through zero. The least significant twenty-two bits of address nine are the destination address for the jump instruction, i.e., address 5. In direct play mode, the programmable display controller 400 outputs the following video signal:

```
0005
0006
0007
0008
0009
000A → The link code is stripped out by the display controller hardware.
0005
0006
.
.
.
```

The programmable display controller 400 can be used in a "viewfinder" feature in a digital camera in which image data stored in an image memory 402 is output to a display 406. To "play" image data in viewfinder mode, a jump instruction (or a call instruction) can be put at the end of the image data specifying the starting address of the image data stored in the image memory 424. Alternatively, the stack can be loaded with the starting address of the image and a return instruction can be put at the end of the image data. The address generator 416 will repetitively request the image data from the same set of addresses. The requested image data will be processed, thereby repetitively displaying the image.

The programmable display controller 400 can concurrently access the image data stored in the image memory while the image data is being modified or updated (i.e., by a procedure executed by a different processor, or by an external source of image data), thereby providing a video mode of operation.

The link codes can be used to manage the organization of the data in the image memory 402. The image memory 402 can be configured in different ways to work with the programmable display controller 400. In one embodiment, the image memory 402 is configured with two image-buffers, each used to store an image. A jump code is placed at the end of each image-buffer to jump to the starting address of the other image-buffer. Therefore, the image data in one image-buffer can be updated while the image data in the other image-buffer is output to the display controller. Alternatively, the image memory 402 can be configured with three or more image-buffers.

The link codes can be used to generate known repetitive patterns in image data. In composite video, a sync signal is conveyed using values that are outside the range of picture information. Sync is output on every line of image data. For example, the link codes can be used to generate sync fields in the video data because the sync field is a repeating pattern. For example, sync fields could be stored in one or more memory words, the first of which is located at a "sync address," followed by a return code. A call link code is used to output the data stored at the "sync address" and the "sync address" is called for each occurrence.

Embedding Link Codes

Link codes are stored in the image data prior to sending the image data to the programmable display controller 400. Many methods can be used to generate image data with link codes. An exemplary method will be described.

In one embodiment, when power is turned on, the camera's microprocessor executes an initialization routine which determines the video mode of the camera's display 406.

Based on the video mode, the camera's microprocessor extracts a template from the camera's memory to use as the data structure for storing the image information in the image memory 402. The image information has pixel values that are used to reproduce the image. Each video mode has a known format with certain additional information that is known to repeat. Video information is output to a display 406 line-by-line. The same information may be repeated at the end of each line. The template organizes the pixel data with the additional display information.

Because video data is processed and output line-by-line, the template is organized line-by-line. A set of "subroutines" comprising known repeating data is stored in the template. Link codes are inserted before or after a line of video information to call the appropriate subroutine. In this example link codes are not inserted into the data within a line. When the pixel values representing the image are processed and stored in the image memory 402, the pixel values are stored in a predetermined location within the template.

For example, sync codes may be repeated at the end of each horizontal line by embedding a call "sync" link code at the end of each line. A plurality of pixel values comprising a line are stored in the memory locations between the call "sync" link codes.

In other implementations, some or all of the image information within a line is encoded with a link code. For example, the camera's microprocessor can execute a link code compress procedure on the image data to replace any repeating image data sequences found in the image data with link codes, and the resulting link codes may be located within lines and at the end of each line.

The Programmable Modulator

The programmable modulator 430 modulates the received data to generate a video signal based on the video mode of the received data. The programmable modulator 430 has a modulation controller 432, a special code decoder 434, a modulation function generator 436 and at least one storage register 437.

The Modulation Controller

Figure 6:
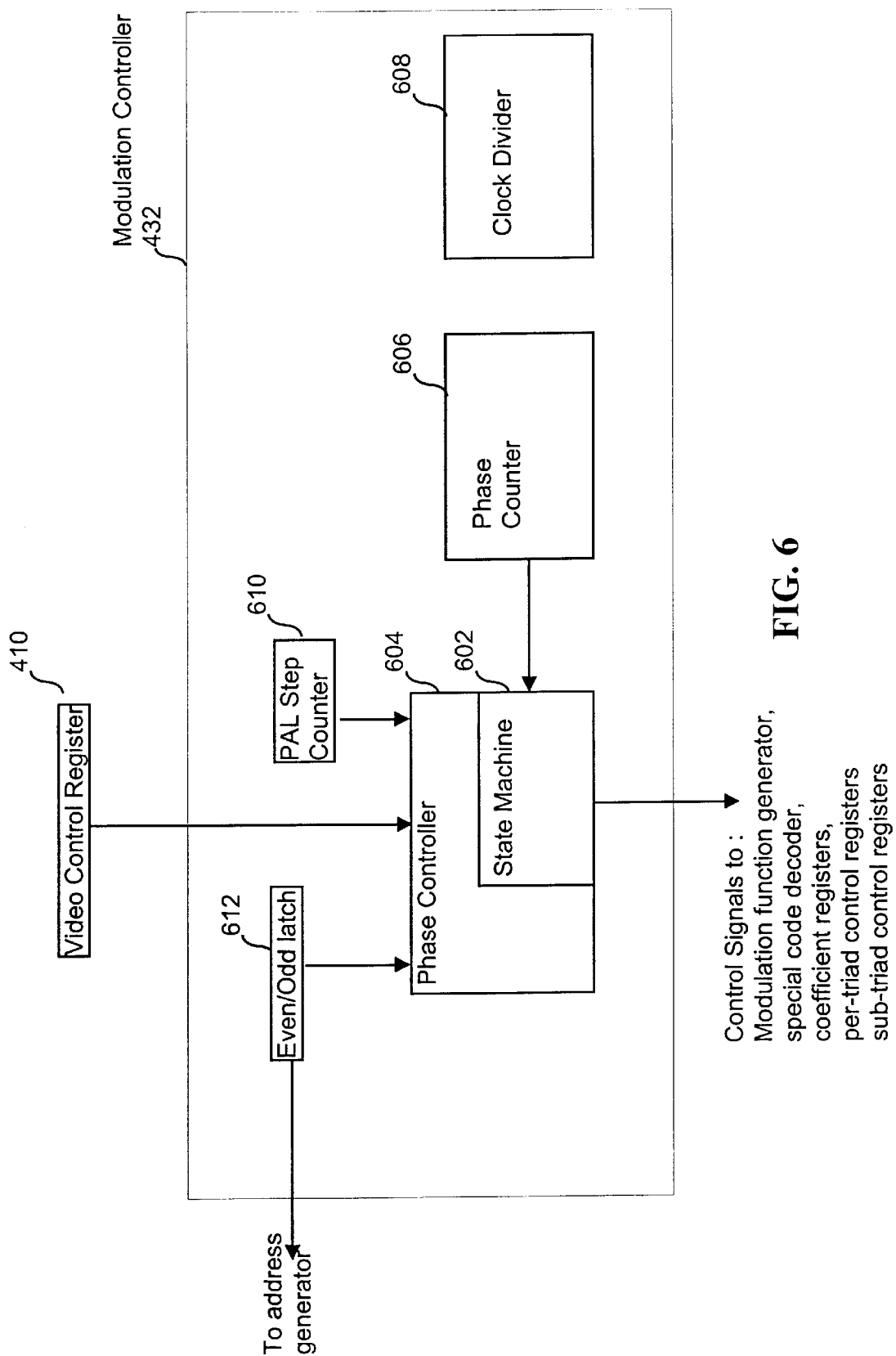
FIG. 6 is a diagram of the modulation controller of FIG. 4.

Referring also to FIG. 6, the modulation controller 432 is coupled to and is responsive to the video control register 410. Based on the input from the video control register 410, the modulation controller 432 controls the modulation function generator 426, special code decoder 434, coefficient registers 438, per-triad control registers 442 and the sub-triad shift registers 437. The modulation controller 432 has a state machine 602 in a phase controller 604, a phase counter 606, a clock divider 608 and a PAL step counter 610.

The modulation controller 432 also has an odd/even latch 612 that stores an odd/even line bit, which is used in some video modes to select the odd or even lines to output to the display. The address generator 426 is also responsive to the odd/even line bit stored in the odd/even latch 612. The address generator 426 can generate addresses for all odd lines to output all odd lines to the display 406 and for all even lines to output all even lines to the display 406 for those video modes that require such interleaving.

The interaction of the modulation controller with the modulation function generator will be described below.

The Storage Registers

The storage register 437 stores values that can be updated from the received data stream. The values include trigonometric and control data. The storage registers 437 comprise at least one coefficient register 438 and at least one control register 441. In alternative embodiments, the storage register 437 can be used as a holding register to store image data, control information, or other numerical values. In the present embodiment, the coefficient register 438 is for storing values to be used by the modulation function generator 436.

The Control Registers

The control registers 441 are for outputting control signals to a display 406. In one embodiment, the control registers 441 include at least one per-triad-control register 442 and at least one sub-triad shift register 444. The per-triad-control register 442 and sub-triad shift register 444 provide control signals that are output to an LCD display (i.e., the control registers 442, 444 are used in this way when the display controller is coupled to an LCD display).

The Special Code Decoder

The special code decoder 434 detects and decodes a special code. The programmable display controller has multiple special codes. One special code (discussed below) causes the storage register 437 to store values from the received data stream. In non-LCD mode, the special codes have values of four, five or six and are stored in the luma channel. Table 5 below summarizes the special codes. The special code decoder 434 stores the value of the special code in the link code bits of the video control register 410.

TABLE 5

| Special Code | |
|---|---|
| Special Code | Description |
| 4 | REPEAT |
| 5 | DEBUG |
| 6 | LOAD SIN/COS |

A value of four represents a repeat function. A value of five represents a debug output pulse function. A value of six represents a load storage register function. The load storage register function allows coefficients to be dynamically extracted from the image data stream and loaded into the coefficient register 438. The present invention has two coefficient registers 438. In alternative embodiments, a single coefficient register 438 can be used, or three or more coefficient registers 438 can be used. In a preferred embodiment, sin(p) and cos(p) values for PAL mode are loaded into the coefficient registers 438 as the coefficient values, as will be discussed in more detail below.

It was discovered that for non-LCD data, the sync field can be used to store the link codes. In one type of video signal, the value "40" represents black and the value "256" represents full saturated color or white. It was discovered that the display 406 does not expect to have all values between zero and forty to recognize that a sync field has occurred, but that the transition between zero and forty was necessary. In other words, the slope was tolerant of variations in value. The present invention is able to "overlay" non-LCD link codes with values of one, two, three, four, five and six -on top of regular video data because such values do not need to be displayed or passed to the display 406.

In alternative embodiments, the special codes have values other than four, five or six and can be stored in a different format in the memory word.

The Modulation Function Generator

The modulation function generator 436 is responsive to the selected video mode stored in the video control word 410 which determines the programmable display controller's 400 memory word format and the video signal output. The modulation function generator 436 is also responsive to the phase controller 604 and counter 606 of the modulation controller 432. In addition, the modulation function generator is also responsive to the odd or even status of a line stored in the odd/even line latch.

In Direct Play Mode, the modulation function generator 436 is programmed to send unmodified image data to the display 406 as sixteen-bit values. In other embodiments the width of the image data values may be other sixteen bits.

In NTSC Video Mode, the modulation function generator 436 is programmed to convert the memory words having a YIQ format to an NTSC composite video signal for output to display 406. The modulation function generator 436 modulates the chroma channel of data and adds the modulated chroma channel to the luma channel prior to output as eight-bit data.

In S-video mode, the modulation function generator 436 is programmed to convert memory words having a YIQ format to an S-video composite signal for output to display 406. The modulation function generator 436 modulates the chroma channel of data and outputs two separate eight-bit channels—a chroma channel and a luma channel.

In PAL mode, the modulation function generator 436 is programmed to convert memory words having a YUV format to an PAL composite video signal for output to display 406.

In LCD mode, the modulation function generator 436 is programmed to output video data in LCD format to the display 406. The programmable modulator 430 plays the LCD formatted data sequentially as eight-bit data and provides six programmable per pixel control signals and eight programmable sub-pixel control signals. In alternative embodiments, the LCD formatted data may have a different bit width and the programmable modulator may provide a different number or combination of control signals.

In a preferred embodiment, the modulation function generator 436 has an arithmetic unit that calculates the video signal modulation function based on the video mode, and the arithmetic unit uses eight-bit two's complement arithmetic to perform signal modulation functions. However, the present invention is not limited to any specific implementation of the arithmetic unit.

The values loaded into the coefficient registers 438 are input to the arithmetic unit of the modulation function generator 436. When in a non-LCD mode, the special code decoder 434 determines that a code of "six" in bits seven through zero of the word from the image memory 402 is a code to load the coefficient registers 438 with the coefficient values stored in the received memory word. The entire thirty-two bit memory word is used and the memory word format is shown below.

| Bits 31:23 | Bits 23:17 | Bit 16 | Bits 15:8 | Bits 7:0 |
|---|---|---|---|---|
| Coefficient 1 | Don't Care | Odd line | Coefficient 2 | 6 |

When the coefficient 1 and coefficient 2 values are loaded into the coefficient registers 438, the output data will use the luma and chroma values from the last pixel prior to the load of the coefficient values for the next output value. If the load does not change the coefficient values and the odd line value, then the same output value is repeated twice. The coefficient registers 438 can be loaded at each line or at any desired location in the image data. The odd/even latch is loaded with the contents of the Odd line bit of the special code. The modulation function generator 436 uses the contents of the odd/even latch to determine the signs of the sine and cosine terms in the PAL modulation function (see discussion of PAL mode, below).

NTSC Mode

In the present embodiment, NTSC mode is selected when the PAL bit in the video -mode select bits of the video control register 410 is not set. In an alternative embodiment, the video control register has a separate NTSC bit. In NTSC mode, the modulation function generator 436 is programmed to perform the mathematical transformation to generate the NTSC composite video signal from YIQ data. The programmable display controller 400 extracts YIQ and sync data from the image data stored in the image memory 402. The modulation function controller 436 modulates the IQ channels at the color burst frequency, then sums the modulated IQ channel with the Y channel to generate the NTSC video signal.

In the present invention, to reduce the amount of image data, only Y and I, or Y and Q values are used to represent each pixel. Each pixel value is stored as a sixteen-bit value in the image memory 402. Table 6 shows the format of a word in the image memory 402 for the NTSC format. In Table 6, the top row shows the bit numbers and the bottom row shows the contents of those bits.

where $$C=\tan^{-1}(Q/I) \text{ and } A=\text{sqrt }(I^2+Q^2)$$

The (I,Q) channels are modulated with the function:

$$Y+I^*\sin(\omega t)+Q^*\cos(\omega t) \quad (1)$$

Because the video sample rate is four times the color burst frequency, the four sample phases of the modulating signal can be chosen to be 0°, 90°, 180° and 270°. Further, because the number of pixel values in a horizontal scan line is an integer, the sine and cosine functions can be represented by the values zero, one, and negative one. One of the two terms in the function shown above is always equal to zero at the chosen phases. Therefore, in addition to the Y value, a single I or Q value can accurately represent each pixel.

When the modulation function generator 436 displays, i.e., plays, the NTSC video data, the modulation function generator 436 either adds or subtracts the I or the Q value to or from the Y value depending on the phase of the modulated NTSC signal. The phase is determined by the phase controller and is input to the modulation function generator 436.

S-video

S-video mode is selected by setting an S-video bit in the video mode select bits in the video control register 410. The modulation function generator 436 can be programmed to perform the mathematical transformation to generate the composite S-video signal. S-video is the same as NTSC video except that the data is played as a sixteen bit value without summing the chroma (Y) and luma (I, Q) channels. When the S-video bit is set, the modulation function generator 436 outputs the luma and chroma channels as two separate eight-bit output channels. The modulation function generator 436 outputs the I or the Q value unchanged or subtracts the I or the Q value from zero prior to output depending on the phase determined by the phase controller.

PAL

The modulation function generator 436 can be programmed to perform the mathematical transformation to generate the PAL composite video signal. PAL mode is selected by setting a PAL bit in the video mode select bits in the video control register 410. PAL is similar to NTSC except that PAL uses a slightly different modulation function and does not have an integer number of pixel values per horizontal scan line. The modulation function is:

$$Y+U^*\sin(\omega t)\pm V^*\cos(\omega t)$$

TABLE 6

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| | | | Chroma (I) | | | | | | | | Luma (Y) | | | | |
| 15 | 14 | 13 | 12 | 11 | 10 | 9 | 8 | 7 | 6 | 5 | 4 | 3 | 2 | 1 | 0 |
| | | | Chroma (Q) | | | | | | | | Luma (Y) | | | | |

In alternative embodiments, the values for Y, I and Q can be stored and the format of the word in the image memory 402 can be different from that shown in Table 6.

Horizontal and vertical sync patterns are created by setting blank and horizontal sync values in the corresponding luma (Y) and the chroma channels (I, Q) to zero in the image memory 402. The color burst is achieved by outputting appropriate YIQ values. The DC value of the color burst is set with the Y channel. A sine wave with any arbitrary phase (C) can be produced with the I and Q channels by using the trigonometric function:

$$I^*\sin(\omega t)+Q^*\cos(\omega t)=A^*\sin(\omega t+C),$$

For PAL, U and V are used for the luma channel and the modulation function alternates between addition and subtraction, i.e., changes phase by 180°, on each scan line. Because the number of pixels in each line is not an integer, the phase of the modulation signal does not remain constant relative to the pixel data. Therefore, a slight compensating adjustment is made to the phase (p) of the modulation signal at the end of each line. The modulation function becomes:

$$Y+U^*\sin(\omega t+p)\pm V^* \cos(\omega t+p)$$

where p is adjusted by 360/625 on each line so that the phase p will cycle 360° in a frame. This allows the data to be stored as two interlaced fields per frame. The pixels, i.e., image data or sample values, are referenced with respect to 0°, 90°, 180° and 270°. Table 7 shows the modulation function at each of the four phases along with its trigonometric equivalent.

TABLE 7

| Line | Phase | Modulation Function | Equivalent Function |
|---|---|---|---|
| Even | 0° | $Y + U * \sin(0 + p) + V * \cos(0 + p)$ | $Y + U * \sin(p) + V * \cos(p)$ |
| Even | 90° | $Y + U * \sin(90 + p) + V * \cos(90 + p)$ | $Y + U * \cos(p) - V * \sin(p)$ |
| Even | 180° | $Y + U * \sin(180 + p) + V * \cos(180 + p)$ | $Y - U * \sin(p) - V * \cos(p)$ |
| Even | 270° | $Y + U * \sin(270 + p) + V * \cos(270 + p)$ | $Y - U * \cos(p) + V * \sin(p)$ |
| Odd | 0° | $Y + U * \sin(0 + p) - V * \cos(0 + p)$ | $Y + U * \sin(p) - V * \cos(p)$ |
| Odd | 90° | $Y + U * \sin(90 + p) - V * \cos(90 + p)$ | $Y + U * \cos(p) + V * \sin(p)$ |
| Odd | 180° | $Y + U * \sin(180 + p) - V * \cos(180 + p)$ | $Y - U * \sin(p) + V * \cos(p)$ |
| Odd | 270° | $Y + U * \sin(270 + p) - V * \cos(270 + p)$ | $Y - U * \cos(p) - V * \sin(p)$ |

For each line, only the sine and cosine of the current value of p are required. The value of sin(p) and cos(p) and whether an odd or even line is being played are embedded in the image data and are automatically extracted by the programmable display controller 400. Like NTSC, to reduce the amount of data stored in the image memory 402 for PAL video data, only the U or the V value is stored with each luma value. At each pixel, i.e., sample value, the missing U or V value is a copy of the previously loaded U or V value.

The values for sin(p) and cos(p) are loaded in the coefficient registers 438 and are input to the arithmetic unit of the modulation function generator 436 using one of the special codes. As applied in PAL mode, the link code memory word format is shown below:

| Bits 31:23 | Bits 23:17 | Bit 16 | Bits 15:8 | Bits 7:0 |
|---|---|---|---|---|
| sin(p) | Don't Care | Odd line | cos(p) | 6 |

When the sin(p) and cos(p) values are loaded, the output data will use the luma (Y) and chroma (U, V) values from the last pixel prior to the load of the sin(p) and cos(p) values for the next output value. If the load does not change the sin(p), cos(p) and odd line values, then the same output value is repeated twice. Odd or even line status is loaded from the special code. In PAL mode, the modulation function generator 436 performs one of the eight modulation function operations for each pixel. The particular modulation function performed is a function of the phase, from the phase controller and counter of the modulation controller, and whether the line is designated as odd or even by the value stored in the odd/even latch. For example, when starting a line, the first thirty-two bit image data words can be organized as shown in Table eight.

TABLE 8

| Word | Bits 31:24 | Bits 23:16 | Bits 15:8 | Bits 7:0 |
|---|---|---|---|---|
| 0 | $U_0$ | $Y_0$ | $V_1$ | $Y_1$ |
| 1 | $U_2$ | $Y_2$ | $V_3$ | $Y_3$ |
| 2 | $U_4$ | $Y_4$ | $V_5$ | $Y_5$ |
| N | $U_{2N}$ | $Y_{2N}$ | $V_{2N+1}$ | $Y_{2N+1}$ |

In alternative embodiments, the memory words can have a different organization.

Assuming even line numbers, the data output sequence is as follows in table nine:

TABLE 9

| | Data Output |
|---|---|
| 0 | $Y_0 + U_0 * \sin(p) + V_{-1} * \cos(p)$ |
| 1 | $Y_1 + U_0 * \cos(p) - V_1 * \sin(p)$ |
| 2 | $Y_2 - U_2 * \sin(p) - V_1 * \cos(p)$ |
| 3 | $Y_3 - U_2 * \cos(p) + V_3 * \sin(p)$ |
| 4 | $Y_0 + U_4 * \sin(p) + V_3 * \cos(p)$ |
| 5 | $Y_1 + U_4 * \cos(p) - V_5 * \sin(p)$ |

$V_{-1}$ is either the chroma value from the last pixel or zero if the programmable display controller 400 is starting for the first time after power is turned on. Typically, $V_1$ will be zero because the chroma values prior to the data field on a line are zero.

In most PAL video systems, to eliminate banding in an image, the color burst frequency is not a harmonic of the pixel sample rate. As a result, for PAL video, the sin(p) and cos(p) values are continuously updated. The sin(p) and cos(p) values change for each pixel in a line of pixels because the phase changes for each pixel in the line. Determining the sin(p) and cos(p) values and performing a modulation computation with the new values is time consuming. On the other hand, if the sin(p) and cos(p) values are stored in a table, then valuable area on an integrated circuit is used up.

The inventors of the present invention have determined that the difference between the color burst and pixel rate is so small that the phase shift did not need to be changed for every pixel in a line, and that the resulting difference in the displayed image was insignificant. The inventors further determined that updating the sin(p) and cos(p) values once per line produced a video image having acceptable quality. In a preferred embodiment of the present invention, the image data is stored such that the special code to change the sin(p) and cos(p) values is embedded in the image data just once per horizontal line. Therefore, storage space is saved because the sin(p) and cos(p) values are not updated for every pixel in a line, and chip space is saved by not having to use a table to store sin(p) and cos(p) values.

LCD Mode

LCD mode is selected when an LCD mode bit in the video control register 410 is set. In LCD mode, the programmable modulator 430 is programmed to output LCD formatted data. LCD formatted data comprises video data (triads) and two types of control signals, LCD Per Triad control and LCD Sub-triad control. The programmable display controller 400 can be programmed to handle any one of a plurality of LCD formats. Examples of LCD formats include RGB, monochrome, complementary color, and pastel RGB. The modulation function generator 436 passes the LCD video data unchanged, and does not pass the link codes. The programmable modulator 430 generates control and timing signals for a class of LCD displays. In one embodiment, the programmable modulator 430 is programmed to extract RGB formatted pixel values and LCD control signal values from the image memory 402, and output the RGB triads sequentially as eight bit values with the extracted LCD control signal values. RGB triad data is stored as a thirty-two bit value in the image memory 402 and output in six or eight phases. The LCD display unit 406 can invert the RGB data.

The programmable modulator 430 outputs LCD video data and LCD control signals on the video data output lines (V_Data). The video data, such as the RGB values, are output to the LCD display 406 on bits seven through zero of V_Data (V_Data(7:0)). The LCD Per Triad control signals are output to the LCD display 406 on bits fourteen through nine of V_Data. The LCD Sub-triad control signals are output to the LCD display 406 on LCD control signal output lines called LCD_CNTL. In LCD mode, there are three types of output:
- (1) Data: Eight bit RGB data. Three bytes of data from the thirty-two bit word are output sequentially on V_Data (7:0) in phases zero, two and four.
- (2) Per triad Control: Six bits of per triad control values are extracted from the top byte of the image memory data by the programmable modulator 430 and stored in the per-triad control register 442.
- (3) Sub-triad Control: Eight bits of sub-triad control can change value up to eight times per pixel. Six of these control bits are generated from an array of six eight-bit recirculating shift registers 444 that can be loaded from the image memory data. The shift registers 444 shift once per phase for a total of six or eight shifts per triad. The least significant bit of each shift register 451 is shifted out in phase zero, the most significant bit is shifted out in phase six or eight. The six shift register output values are output on the LCD_CNTL(5:0). Two additional sub pixel control bits, called Toggle bit one and Toggle bit zero, are available. These bits toggle on any phase in which LCD_CNTL(4) is high and Toggle bit one also toggles when LCD_CNTL(5) is high. Toggle bit zero is output on V_DATA(15), Toggle bit one is output on LCD_CNTL(6).

LCD Mode Image Memory Data Format

A special code is used to load the per-triad control register 442. The LCD mode image memory data format is shown below:

| Bit 31 | Bit 30 | Bits 29:24 | Bits 23:16 | Bits 15:8 | Bits 7:0 |
|---|---|---|---|---|---|
| Link = 0 | Load = 0 | Per_Triad_ Control | RGB0 | RGB1 | RGB2 |

Per_Triad_Control is output in phase zero on V-Data(14:9). RGB0 is data value R, G or B which is output in phase zero on V_data (7:0). RGB1 is data value R, G or B which is output in phase two on V_data (7:0). RGB2 is data value R, G or B which is output in phase four on V_data (7:0).

Link is the link control bit. When set to one, link indicates that bits one through zero should be used as a link code.

Load is the load control bit. When set to one, load indicates that the sub-triad LCD shift register 444 is to be loaded from bits twenty-three through zero of the current word.

| Bit 31 | Bit 30 | Bits 29:25 | Bit 24 | Bits 23:16 | Bits 15:8 | Bits 7:0 |
|---|---|---|---|---|---|---|
| Link | Load | Sel | 0 | LCD_ CNTL5/2 | LCD_ CNTL4/1 | LCD_ CNTL3/0 |

When Link equals zero and load equals one, then:
LCD_CNTL5/2 is the value to be loaded into the LCD_CNTL(5) and LCD_CNTL(2) shift registers 444, or is unused, depending on the value of SEL;
LCD_CNTL4/1 is the value to be loaded into the LCD_CNTL(4) and LCD_CNTL(1) shift registers 444, or is unused, depending on the value of SEL;
LCD_CNTL3/0 is the value to be loaded into the LCD_CNTL(3) and LCD_CNTL(0) shift registers 444, or is unused, depending on the value of SEL.

SEL defines the type of load operation to be performed, as follows:

00000=Load LCD_CNTL(2:0) shift registers only
10000=Load LCD_CNTL(5:3) shift registers only
00001=Load LCD_CNTL(2:0) shift registers and set LCD_Invert
10001=Load LCD_CNTL(5:3) shift registers and set LCD_Invert
00010=Load LCD_CNTL(2:0) shift registers and Clear LCD_Invert
10010=Load LCD_CNTL(5:3) shift registers and Clear LCD_Invert
00011=Load LCD_CNTL(2:0) shift registers and Toggle LCD_Invert
10011=Load LCD_CNTL(5:3) shift registers and Toggle LCD_Invert
01000=No operation
01001=Set LCD_Invert only. When set, output one's complement RGB data.
01010=Clear LCD_Invert only. When clear data is unaffected.
00111=Toggle LCD_Invert only.

Although the invention has been described using an exemplary word format, in other embodiments the word format can be changed.

Although the per-triad control registers 442 and the associated link code have been described with respect to LCD data having a RGB format, the link code and associated data format can be applied to a more general class of data having control signals associated with three image information values, i.e., commonly known as a triad, a tuple or a tri-stimulus tuple. In other words, the class of data would comprise a control signal field and an associated triad of image information values. The class data format is shown below:

| Bit 31 | Bit 30 | Bits 29:24 | Bits 23:16 | Bits 15:8 | Bits 7:0 |
|---|---|---|---|---|---|
| Link | Load | Control | Value 1 | Value 2 | Value 3 |

For example, in another embodiment, the invention can be applied to a control signal field and YUV formatted data. Therefore, the present invention provides flexibility in providing video signals for many classes of displays.

Other Special Codes

The programmable display controller 400 also supports repeat codes to reduce data bandwidth requirements in all modes. A repeat code is a special code which causes the previous data to be output for a specified number of times, where the specified number is determined by the repeat code. The special code decoder 434 of the programmable modulator 430 detects and decodes the repeat code.

The Modulation Function Generator and the Phase Controller

Figure 7:
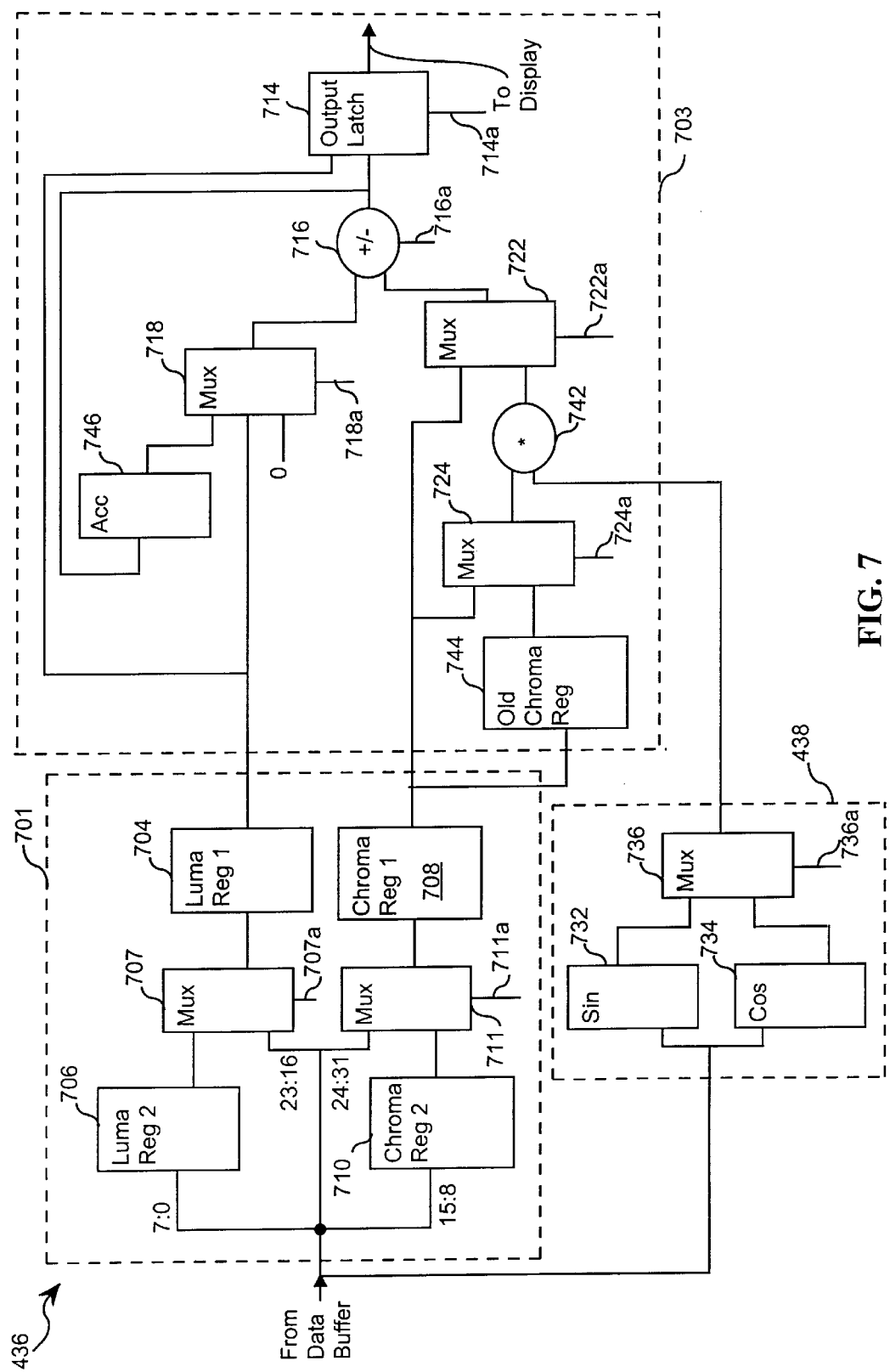
FIG. 7 is a diagram of the modulation function generator of FIG. 4.

Referring to FIGS. 6 and 7, the components of the modulation function generator 436 will be described. In addition, the operation of the modulation function generator 436 will be described for generating various exemplary video signals.

Generally the modulation function generator 436 is controlled by the phase controller 432 and generates a video signal which is output to a display. The type of video signal output depends on the values stored in the mode select bits of the video control register. The phase controller 604 of the modulation controller 432 has a state machine 602 that generates control signals for the modulation function generator 436 of FIG. 7. The modulation function generator 436 has an input block 701, coefficient registers 438 and an arithmetic block 703 which are responsive to the control signals from the phase controller.

In FIG. 7, an input block 701 receives video data from the data buffer 422 of FIG. 4. The input block 701 has four registers 704, 706, 708, 710 that store an entire word of video data. In the NTSC, S-video, and PAL data formats described above, a word has image data for two pixels. Luma Registers one and two, 704 and 706, respectively, are used to store luma values and are coupled via multiplexor 707. When a word is retrieved from the data buffer to the input block 701, Luma Register one 704 stores a first luma value for a first pixel from bits 23:16 of the word, and Luma Register two 706 stores a second luma value for a second pixel from bits 7:0 of the word. The value stored in Luma Register one 704 is supplied to an output latch 714 for output to the display. The value stored in Luma Register one 704 is also supplied to an arithmetic logic unit 716 via another multiplexor 718. After the luma value for the first pixel in Luma Register one 704 is processed and output to the display, the value stored in Luma Register two 706 is transferred to Luma Register one 704 via the multiplexor 707 for output. The state machine 602 (FIG. 6) generates a control signal 707a that controls the multiplexor 707 to perform this data transfer.

Similarly, Chroma Registers one and two, 708 and 710, respectively, store chroma values and are coupled via multiplexor 711. When a word is retrieved from the data buffer to the input block 701, Chroma Register one 708 stores a chroma value for the first pixel from bits 24:31 of the word, and Chroma Register two 710 stores a chroma value for the second pixel from bits 15:8 of the word. The value stored in Chroma Register one 708 is supplied to the arithmetic logic unit 716 via a multiplexor 722. The state machine 602 (FIG. 6) of the phase controller 604 supplies a control signal 722a to the multiplexor 722 to transfer either the value stored in Chroma Register one 708 or the output of a multiplier 742 to arithmetic logic unit 716.

The coefficient registers 438 have a sin register 732 and a cos register 734 for storing respective sine and cosine values. The outputs of the sin register 732 and cos register 734 are supplied via a multiplexor 736 to multiplier 742. The state machine 602 (FIG. 6) of the phase controller 604 (FIG. 6) supplies a control signal 736a to the multiplexor 736 to supply either the value stored in the sin register 732 or cos register 734 to multiplier 742 in the arithmetic block 703. Although FIG. 4 shows that the coefficient registers 438 as being separate from the modulation function generator 436, for purposes of FIG. 7 the coefficient registers 438 can be considered to be part of the modulation function generator, or as an external source of sin and cos values.

The state machine 602 (FIG. 6) of the phase controller 604 (FIG. 6) generates control signals that control the multiplexors 707, 711, 718, 722, 724, the multiplier 742 and the arithmetic logic unit 716 of the arithmetic block 703. In the arithmetic block 703, an Old Chroma Register 744 stores a previous chroma value, and is initially set to zero. The Old Chroma Register 744 is loaded with the chroma value that is supplied to Chroma Register One 708. The multiplier 742 multiplies a value from the selected coefficient register 438 by either the new chroma value stored in Chroma Register one 708 or the old chroma value stored in the Old Chroma Register 744. The state machine 602 (FIG. 6) generates a control signal 724a that controls the multiplexor 724 to determine whether the value in the Old Chroma Register 744 or Chroma Register one 708 is supplied to the multiplier 742.

The arithmetic logic unit 716 performs an addition or subtraction depending on the control signal 716a supplied by the state machine 602 (FIG. 6). The output of the arithmetic logic unit 716 is supplied to the output latch 714 for output to the display, and is also supplied to an accumulator register 746. The value in the accumulator register 746 is supplied to another input of multiplexor 718 so that the values in the accumulator register 746 can be added to the values supplied to the other input of the arithmetic logic unit 716. In addition, one of the inputs of multiplexor 718 is supplied with a zero value 748. The state machine 602 (FIG. 6) generates a control signal 718a to select the desired value to supply to the arithmetic logic unit 716.

The operation of the modulation function generator 436 will now be described with respect to exemplary video modes.

Direct Play

In direct play mode, a word is loaded into the Luma and Chroma Registers, 704, 706, 708, 710 as described above. The luma value in Luma Register one is supplied to the output latch 714. The state machine 602 (FIG. 6) generates a signal 718a that enables the multiplexor 718 to supply a zero to the arithmetic logic unit 716 and also enables multiplexor 722 to supply the chroma value in Chroma Register one 708 to the arithmetic logic unit 716. The output of the arithmetic logic unit 716 is equal to the value stored in Chroma Register one 708 and supplied to the output latch 714. At the appropriate time, the state machine 602 generates the V_DATA_STROBE signal to output the video data in the output latch 714 to the display.

To output the next pixel, state machine 602 generates control signals 707a and 711a to multiplexors 707 and 711, respectively, to transfer the luma and chroma values stored in Luma Register two 706 and in Chroma Register two 711 to Luma Register one 704 and Chroma Register one 708, respectively. Once the values are loaded into Luma Register one 704 and Chroma Register one 708, the values are output as described above.

NTSC

For NTSC video, initially the Y and I values for pixel one are loaded into Luma Register one 704 and Chroma Register one 708, respectively, while the Y and Q values for pixel two are loaded into Luma Register two 706 and Chroma Register two 710, respectively. Since the phase determines whether Q or I is added or subtracted from Y, the phase counter 606 (FIG. 6) of the modulation controller 432 is used to determine the phase by the state machine 602 (FIG. 6). The phase counter 606 (FIG. 6) has four phases. On phases zero and one, the state machine generates a control signal 716a to the arithmetic logic unit 716 to add the input signals. On phases two and three, the state machine 602 (FIG. 6) generates a control signal 716a to the arithmetic logic unit 716 to subtract the input signals. After the values stored in Luma Register one 704 and Chroma Register one 708 are processed and output, the values in the Luma Register two 706 and Chroma Register two 710 are processed and output.

S-Video

For outputting an S-video signal, the phase controller 606 (FIG. 6) operates in a similar manner to NTSC video except that modulation function generator outputs the I or Q value in the Chroma Registers either unchanged or subtracted from zero (using arithmetic unit 716) prior to output via the output latch 714. The luma values in Luma Register one 704 are output directly via output latch 714 in parallel with the chroma values.

PAL

The generation of the PAL video signal uses two steps to cause the modulation function generator to generate the "Equivalent Function" shown above in Table 7. When the PAL bit in the video control register indicates PAL mode, the state machine 602 (FIG. 6) uses the output of a PAL step counter 610 (FIG. 6) to determine the step, the output of the even/odd bit in the even/odd latch 612 (FIG. 6) to determine whether a line is even or odd, and the output of the phase counter 606 (FIG. 6) to determine the phase. The generation of the PAL signal also uses the accumulator 746 to store intermediate results that are generated after the first step. In the second step, the final result is generated and output via the output latch 714.

Referring also to the table in FIG. 8, an exemplary state diagram is implemented by the state machine 602 for a subset of even lines as indicated by the even/odd latch 612. Except for an initial state, the generation of the PAL video signal is similar for each phase, therefore the generation of the PAL video signal for phase zero will be described. In the first line of the state diagram, for pixel zero, an initial condition is shown in which the phase in the phase counter 606 and the value in the Old Chroma Register 744 are set equal to zero. The state of the PAL step counter 610 is reset to one. To output pixel zero, Luma Register one stores a YO value and Chroma Register one stores a U0 value. Although it is not shown, note that Luma Register two stores a Y1 value and Chroma Register two stores a V1 value.

Referring also to FIGS. 6 and 7, after setting the initial conditions, the generation of the PAL video signal begins. The PAL step counter 610 toggles to zero and the state machine 602 generates the appropriate control signals to cause the accumulator 746 to store an intermediate value, Y0+0 cos, which is equal to Y0. In other words, the accumulator 746 stores the value of the Luma Register one 704 added to the product of the value in the Old Chroma Register 744, which is zero, multiplied by the value loaded into the cos register 734. The output latch 714 is not loaded with the intermediate value.

In the next step, the PAL step counter 610 toggles to one and the state machine 602 generates the control signals to cause the arithmetic logic unit 716 to add the value in the accumulator 746 to the product of the value in Chroma Register one 708 and the value loaded in the sin register 732 to generate the output signal, Y0+0 cos+U0 sin, which is loaded in the output register 714. The state machine 602 then generates the video strobe signal. Therefore, pixel zero has been output.

To output pixel one, the values loaded in luma register two 706 and Chroma Register two 710 are transferred to Luma Register one 704 and Chroma Register one 708, respectively, the step counter is toggled, the phase counter is incremented and the process repeats for the next state. Therefore, an entire word has been output.

To output pixel two, the Y2, U2 and Y3, V3 values from the next word are loaded into the registers of the input block and processed in a manner similar to that described above for pixels zero and one.

Other Features

The programmable display controller also supports invert codes to invert data in the LCD mode.

The programmable display controller 400 has a separate crystal input for the system clock to allow for precise frequency selection for playback. The programmable display controller 400 can be programmed using the video control register 402 to divide the crystal frequency by an integer value between two and sixty-four. The programmable display controller 400 also has a data strobe output. The data strobe is generated when the output data changes with programmable setup and hold times. The data strobe is used to meet the timing requirements for various digital-to-analog (D/A) converters.

Although the present invention has been described with respect to a digital camera, the programmable display controller can also be used in other devices having a display for displaying digital image data such as computers, including notebook computers, personal digital assistants, scanners and printers.

In summary, the present invention provides link codes which reduce the amount of storage space needed in the image memory. The present invention can output data in a various video formats and can be used with a many display devices.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A programmable display controller for use in a digital imaging system, the programmable display controller comprising:

a video control register for storing video mode bits indicating any one of a plurality of predefined video signal types to output;

a data access controller having a buffer for requesting image data and storing the requested image data in the buffer and the data access controller includes an address generator for generating a sequence of memory addresses from which to request data, wherein the requested image data stores addressing codes within the image data, and the data access controller includes a decoder for detecting the addressing codes embedded in the image data, and wherein the address generator is responsive to the detected addressing codes by altering the generated sequence of memory addresses in accordance with addresses incorporated in the detected addressing codes; and a programmable modulator, responsive to the video mode bits, for generating a video signal from the image data stored in the buffer, the generated video signal being of the type indicated by the video mode bits;

whereby the programmable display controller can be used in conjunction with any of a plurality of types of display devices that utilize video signals of the types included in the plurality of predefined video signal types.

2. The programmable display controller of claim 1 wherein the predefined video signal types include direct play, NTSC, S-video, PAL and LCD video signals, and the programmable modulator includes circuitry for generating direct play, NTSC, S-video PAL and LCD video signals.

3. The programmable display controller of claim 1 wherein the video control register has LCD mode select bits that indicate whether the generated video signal is to be in RGB, monochrome, complementary color or pastel RGB LCD format, and the programmable modulator includes circuitry for generating RGB, monochrome, complementary color or pastel RGB LCD format video signals.

4. The programmable display controller of claim 1 wherein the data access controller further comprises:

a stack coupled to the address generator for storing address information for use with call and return addressing codes embedded in the image data.

5. The programmable display controller of claim 1 wherein the requested image data stores a link code within the image data, and the address generator, in response to the decoder, requests data by outputting a link address corresponding to a decoded link code for fetching new data stored at the link address.

6. The programmable display controller of claim 5 wherein the link code is a jump link code specifying a memory address at which image data is to be retrieved by the data access controller.

7. The programmable display controller of claim 1 wherein the programmable modulator further comprises:
    a modulation controller; and
    lcd control registers, responsive to the modulation controller, for outputting LCD control signals to an LCD display.

8. The programmable display controller of claim 1 wherein the LCD control registers comprise:
    per-triad control registers for outputting one set of per-triad control signals for a triad of video data values;
    sub-triad control registers for outputting multiple sets of sub-triad control signals for the triad of video data values.

9. The programmable display controller of claim 1 further comprising:
    a coefficient register for storing values embedded in the image data;
    a special code decoder for decoding special codes for use in loading the coefficient register; and
    a modulation function generator, in the programmable modulator, for generating the video signal from the image data and a value loaded in the coefficient register.

10. The programmable display controller of claim 1 wherein the programmable modulator, further includes:
    a phase controller; and
    a modulation function generator, wherein the phase controller generates
    control signals based on the video mode bits to control generation of the video signal by the modulation function generator.

11. The programmable display controller of claim 10 wherein the modulation function generator further includes:
    an input block for receiving the image data; a coefficient register;
    a multiplier for multiplying a subset of the image data in the input block by a value stored in the coefficient register based on control signals from the phase controller; and an arithmetic logic unit for adding or subtracting the output of the multiplier to another subset of the image data from the input block to generate the video signal based on control signals from the phase controller.

12. A programmable display controller for use in a digital imaging system, the programmable display controller comprising:
    a video control register for storing video mode bits indicating any one of a plurality of predefined video signal types to output;
    a data access controller having a buffer for requesting image data and storing the requested image data in the buffer;
    a programmable modulator, responsive to the video mode bits, for generating a video signal from the image data stored in the buffer, the generated video signal being of the type indicated by the video mode bits;
    whereby the programmable display controller can be used in conjunction with any of a plurality of types of display devices that utilize video signals of the types included in the plurality of predefined video signal types;
    a coefficient register for storing values embedded in the image data;
    a special code decoder for decoding special codes for use in loading the coefficient register; and
    a modulation function generator, in the programmable modulator, for generating the video signal from the image data and a value loaded in the coefficient register.

13. The programmable display controller of claim 12 wherein the predefined video signal types include direct play, NTSC, S-video, PAL and LCD video signals, and the programmable modulator includes circuitry for generating direct play, NTSC, S-video, PAL and LCD video signals.

14. The programmable display controller of claim 12 wherein the video control register has LCD mode select bits that indicate whether the generated video signal is to be in RGB, monochrome, complementary color or pastel RGB LCD format, and the programmable modulator includes circuitry for generating RGB, monochrome, complementary color or pastel RGB LCD format video signals.

15. The programmable display controller of claim 12 wherein the data access controller further includes:
    an address generator for generating a sequence of memory addresses from which to request data, wherein the requested image data stores addressing codes within the image data;
    a decoder for detecting the addressing codes embedded in the image data, wherein the address generator is responsive to the detected addressing codes by altering the generated sequence of memory addresses in accordance with addresses incorporated in the detected addressing codes; and
    a stack coupled to the address generator for storing address information for use with call and return addressing codes embedded in the image data.

16. The programmable display controller of claim 12 wherein the data access controller further includes:
    an address generator for generating a sequence of memory addresses from which to request data, wherein the requested image data stores addressing codes within the image data; and
    a decoder for detecting the addressing codes embedded in the image data, wherein the address generator is responsive to the detected addressing codes by altering the generated sequence of memory addresses in accordance with addresses incorporated in the detected addressing codes;
    wherein the requested image data stores a link code within the image data, and the address generator, in response to the decoder, requests data by outputting a link address corresponding to a decoded link code for fetching new data stored at the link address.

17. The programmable display controller of claim 16 wherein the data access controller further includes:
    an address generator for generating a sequence of memory addresses from which to request data, wherein the requested image data stores addressing codes within the image data; and
    a decoder for detecting the addressing codes embedded in the image data, wherein the address generator is responsive to the detected addressing codes by altering the generated sequence of memory addresses in accordance with addresses incorporated in the detected addressing codes;

wherein the link code is a jump link code specifying a memory address at which image data is to be retrieved by the data access controller.

18. The programmable display controller of claim 12 wherein the programmable modulator further comprises:
a modulation controller; and
lcd control registers, responsive to the modulation controller, for outputting LCD control signals to an LCD display.

19. The programmable display controller of claim 12 wherein the LCD control registers comprise:
per-triad control registers for outputting one set of per-triad control signals for a triad of video data values;
sub-triad control registers for outputting multiple sets of sub-triad control signals for the triad of video data values.

20. The programmable display controller of claim 12 wherein the programmable modulator, further includes:
a phase controller; and
a modulation function generator, wherein the phase controller generates control signals based on the video mode bits to control generation of the video signal by the modulation function generator.

21. The programmable display controller of claim 20 wherein the modulation function generator further includes:
an input block for receiving the image data; a coefficient register;
a multiplier for multiplying a subset of the image data in the input block by a value stored in the coefficient register based on control signals from the phase controller; and
an arithmetic logic unit for adding or subtracting the output of the multiplier to another subset of the image data from the input block to generate the video signal based on control signals from the phase controller.

22. A programmable display controller for use in a digital imaging system, the programmable display controller comprising:
a video control register for storing video mode bits indicating any one of a plurality of predefined video signal types to output;
a data access controller having a buffer for requesting image data and storing the requested image data in the buffer;
a programmable modulator, responsive to the video mode bits, for generating a video signal from the image data stored in the buffer, the generated video signal being of the type indicated by the video mode bits, wherein the programmable modulator includes a phase controller and a modulation function generator, wherein the phase controller generates control signals based on the video mode bits to control generation of the video signal by the modulation function generator; and
whereby the programmable display controller can be used in conjunction with any of a plurality of types of display devices that utilize video signals of the types included in the plurality of predefined video signal types.

23. The programmable display controller of claim 22 wherein the modulation function generator further includes:
an input block for receiving the image data; a coefficient register;
a multiplier for multiplying a subset of the image data in the input block by a value stored in the coefficient register based on control signals from the phase controller; and
an arithmetic logic unit for adding or subtracting the output of the multiplier to another subset of the image data from the input block to generate the video signal based on control signals from the phase controller.

24. The programmable display controller of claim 22 wherein the predefined video signal types include direct play, NTSC, S-video, PAL and LCD video signals, and the programmable modulator includes circuitry for generating direct play, NTSC, S-video, PAL and LCD video signals.

25. The programmable display controller of claim 22 wherein the video control register has LCD mode select bits that indicate whether the generated video signal is to be in RGB, monochrome, complementary color or pastel RGB LCD format, and the programmable modulator includes circuitry for generating RGB, monochrome, complementary color or pastel RGB LCD format video signals.

26. The programmable display controller of claim 22 wherein the data access controller further includes:
an address generator for generating a sequence of memory addresses from which to request data, wherein the requested image data stores addressing codes within the image data;
a decoder for detecting the addressing codes embedded in the image data, wherein the address generator is responsive to the detected addressing codes by altering the generated sequence of memory addresses in accordance with addresses incorporated in the detected addressing codes; and
a stack coupled to the address generator for storing address information for use with call and return addressing codes embedded in the image data.

27. The programmable display controller of claim 22 wherein the data access controller further includes:
an address generator for generating a sequence of memory addresses from which to request data, wherein the requested image data stores addressing codes within the image data; and
a decoder for detecting the addressing codes embedded in the image data, wherein the address generator is responsive to the detected addressing codes by altering the generated sequence of memory addresses in accordance with addresses incorporated in the detected addressing codes;
wherein the requested image data stores a link code within the image data, and the address generator, in response to the decoder, requests data by outputting a link address corresponding to a decoded link code for fetching new data stored at the link address.

28. The programmable display controller of claim 27 wherein the data access controller further includes:
an address generator for generating a sequence of memory addresses from which to request data, wherein the requested image data stores addressing codes within the image data; and
a decoder for detecting the addressing codes embedded in the image data, wherein the address generator is responsive to the detected addressing codes by altering the generated sequence of memory addresses in accordance with addresses incorporated in the detected addressing codes;
wherein the link code is a jump link code specifying a memory address at which image data is to be retrieved by the data access controller.

29. The programmable display controller of claim 22 wherein the programmable modulator further comprises:

a modulation controller; and lcd control registers, responsive to the modulation controller, for outputting LCD control signals to an LCD display.

30. The programmable display controller of claim 22 wherein the LCD control registers comprise:

per-triad control registers for outputting one set of per-triad control signals for a triad of video data values;

sub-triad control registers for outputting multiple sets of sub-triad control signals for the triad of video data values.

31. A method for generating a video signal, the method comprising the steps of:

storing video mode bits in a video control register to indicate any one of a plurality of predefined video signal types to output;

requesting image data;

storing the image data in a buffer of a data access controller;

generating a sequence of memory addresses by an address generator in the data access controller for requesting image data, wherein the image data includes addressing codes;

detecting the addressing codes embedded in the image data by a decoder in the data access controller;

altering the generated sequence of memory addresses in accordance with addresses incorporated in the detected addressing codes by the address generator in response to the addressing codes; and generating a video signal by a programmable modulator from the image data stored in the buffer in response to the video mode bits, the generated video signal being of the type indicated by the video mode bits.

32. The method of claim 31 wherein the predefined video signal types include direct play, NTSC, S-video, PAL and LCD video signals, and the programmable modulator includes circuitry for generating direct play, NTSC, S-video, PAL and LCD video signals.

33. The method of claim 31 wherein the video control register has LCD mode select bits that indicate whether the generated video signal is to be in RGB, monochrome, complementary color or pastel RGB LCD format, and the programmable modulator includes circuitry for generating RGB, monochrome, complementary color or pastel RGB LCD format video signals.

34. The method of claim 31 further comprising the step of storing address information in a stack coupled to the address generator for use with call and return addressing codes embedded in the image data.

35. The method of claim 31 wherein the requested image data stores a link code within the image data, and the address generator, in response to the decoder, requests data by outputting a link address corresponding to a decoded link code for fetching new data stored at the link address.

36. The method of claim 35 wherein the link code is a jump link code specifying a memory address at which image data is to be retrieved by the data access controller.

* * * * *